United States Patent
Wang et al.

(10) Patent No.: US 10,227,725 B2
(45) Date of Patent: Mar. 12, 2019

(54) TUNING SURFACE PROPERTIES OF MELT BLOWN POLYESTER FIBERS BY HYDROLYSIS AND SOLUTION GRAFTING

(71) Applicants: Cummins Filtration IP, Inc., Columbus, IN (US); Regents of the University of Minnesota, Minneapolis, MN (US)

(72) Inventors: Zaifei Wang, Minneapolis, MN (US); Frank S. Bates, Minneapolis, MN (US); Christopher W. Macosko, Minneapolis, MN (US); Kan Wang, Cookeville, TN (US); William C. Haberkamp, Cookeville, TN (US); Christopher E. Holm, Stoughton, WI (US)

(73) Assignees: Cummins Filtration IP, Inc., Columbus, IN (US); Regents of the University of Minnesota, Minneapolis, MN (US)

( * ) Notice: Subject to any disclaimer, the term of this patent is extended or adjusted under 35 U.S.C. 154(b) by 178 days.

(21) Appl. No.: 15/303,398

(22) PCT Filed: Jan. 2, 2015

(86) PCT No.: PCT/US2015/010028
§ 371 (c)(1),
(2) Date: Oct. 11, 2016

(87) PCT Pub. No.: WO2015/160392
PCT Pub. Date: Oct. 22, 2015

(65) Prior Publication Data
US 2017/0030011 A1 Feb. 2, 2017

Related U.S. Application Data

(60) Provisional application No. 61/980,305, filed on Apr. 16, 2014.

(51) Int. Cl.
| | | |
|---|---|---|
| *C08G 63/02* | (2006.01) | |
| *D06M 13/33* | (2006.01) | |
| *D06M 11/38* | (2006.01) | |
| *D06M 13/477* | (2006.01) | |
| *D06M 14/14* | (2006.01) | |
| *F01M 13/04* | (2006.01) | |
| *D04H 1/435* | (2012.01) | |
| *D04H 3/011* | (2012.01) | |
| *D04H 1/56* | (2006.01) | |
| *D06M 101/32* | (2006.01) | |

(52) U.S. Cl.
CPC ............ *D06M 13/33* (2013.01); *D04H 1/435* (2013.01); *D04H 1/56* (2013.01); *D04H 3/011* (2013.01); *D06M 11/38* (2013.01); *D06M 13/477* (2013.01); *D06M 14/14* (2013.01); *F01M 13/04* (2013.01); *B01D 2239/0622* (2013.01); *D06M 2101/32* (2013.01); *D06M 2200/12* (2013.01); *F01M 2013/0438* (2013.01)

(58) Field of Classification Search
CPC ..................................................... D06M 13/33
USPC ........................................................ 528/299
See application file for complete search history.

(56) References Cited

U.S. PATENT DOCUMENTS

| | | | |
|---|---|---|---|
| 2,828,528 A * | 4/1958 | Gajjar | ................... D06M 11/38 216/83 |
| 3,017,685 A | 1/1962 | Heberlein | |
| 3,096,557 A | 7/1963 | Messinger | |
| 3,111,359 A | 11/1963 | Fang | |
| 3,135,577 A | 6/1964 | Watson | |
| 3,287,787 A | 11/1966 | Goulding et al. | |
| 4,008,044 A | 2/1977 | Latta et al. | |
| 4,803,256 A | 2/1989 | Luckenbach | |
| 4,842,792 A | 6/1989 | Bagrodia et al. | |
| 5,109,103 A * | 4/1992 | Re | .......................... A61L 27/18 525/418 |
| 5,124,205 A | 6/1992 | Raynolds et al. | |
| 7,524,425 B2 | 4/2009 | Mari et al. | |
| 7,736,516 B2 | 6/2010 | Zambianchi et al. | |
| 7,842,624 B2 | 11/2010 | Hennige et al. | |

(Continued)

FOREIGN PATENT DOCUMENTS

WO  WO-2012/016237  2/2012

OTHER PUBLICATIONS

Bongiovanni et al., "Water resistance improvement of filter paper by a UV-grafting modification with a fluoromonomer", Colloids and Surfaces A: Physicochem. Eng. Aspects 418, 2013, pp. 52-59.

(Continued)

*Primary Examiner* — Terressa Boykin
(74) *Attorney, Agent, or Firm* — Foley & Lardner LLP

(57) ABSTRACT

Described herein is a continuous process for modifying the properties of polyester and polyester based fibers, such as a poly(butylene terephthalate) (PBT) fiber, comprising subjecting the PBT fiber to alkaline hydrolysis, and optionally further comprising functionalizing the PBT fiber by solution grafting such as fluorination. The alkaline hydrolysis and optionally subsequent functionalization such as fluorination process can be continuous, following the melt blowing/spinning or spun-bonding process. Also described is a non-woven PBT fiber mat obtained by the surface modification process. Further described is a filtration device comprising the nonwoven PBT fiber mat.

9 Claims, 12 Drawing Sheets

(56) References Cited

U.S. PATENT DOCUMENTS

2002/0155225 A1  10/2002  Yeh et al.
2003/0216524 A1  11/2003  Bide et al.

OTHER PUBLICATIONS

Catalani et al., "Evidence for Molecular Orientation and Residual Charge in the Electrospinning of Poly(butylene terephthalate) Nanofibers", Macromolecules, 2007, pp. 1693-1697.
Chen et al., "Structure and Properties of High-speed Melt-Spun Filaments of Poly(butylene Terephthalate)", Journal of Applied Polymer Science, vol. 33, 1987, pp. 1427-1444.
Dave et al., "Studies on Modification of Polyester Fabrics I: Alkaline Hydrolysis", Journal of Applied Polymer Science, vol. 33, 1987, pp. 455-477.
Doan et al., "Localization of nanofibers on polymer surface using interface transfer technique", Composites Part B: Engineering, Apr. 2012, pp. 1218-1223.
Ellison et al., "Melt blown nanofibers: Fiber diameter distributions and onset of fiber breakup", Polymer 48, 2007, pp. 3306-3316.
Fareghi et al., "Modification of hydrophilic cellulose fibers by monolayer growth of polystyrene chains using ATRP", Iranian Polymer Journal, May 2013, pp. 361-367.
Fernandez-Blazquez et al., "Superhydrophilic and superhydrophobic nanostructured surfaces via plasma treatment", Journal of Colloid and Interface Science 357, 2011, pp. 234-238.
Gerard et al., "Surface Modification of Poly(butylene terephthalate) Nonwoven by Photochemistry and Biofunctionalization with Peptides for Blood Filtration", Journal of Polymer Science Part A: Polymer Chemistry, 2011, pp. 5087-5099.
Guo et al., "Poly(butylene terephthalate) Electrospun/Melt-Blown Composite Mats for White Blood Cell Filtration", Journal of Applied Polymer Science, 2013, pp. 3652-3659.
Hadjizadeh et al., "Preparation and characterization of NaOH treated micro-fibrous polyethylene terephthalate nonwovens for biomedical application", Journal of the Mechanical Behavior of Biomedical Materials 3, 2010, pp. 574-583.
Hardman et al., "Electrospinning Superhydrophobic Fibers Using Surface Segregating End-Functionalized Polymer Additives", ACS Publications, 2011, pp. 6461-6470.
Hollister, Scott J., "Porous scaffold design for tissue engineering", Nature Publishing Group, Jul. 2005, pp. 518-524.
Holmes et al., "Surface Area of Aqueous Sodium Hydroxide Hydrolyzed High-speed Spun Poly(ethylene terephthalate) Fibers", Journal of Applied Polymer Science, vol. 55, 1995, pp. 1573-1581.
Huang et al., "Surface functionalization of silk fabric by PTFE sputter coating", J Matter Sci, 2007, pp. 8025-8028.
Hutten, Irwin M., "Processes for Nonwoven Filter Media", Handbook of Nonwoven Filter Media, Elsevier Science: Burlington, Massachusetts, 2007, pp. 195-244.
Ikada et al., "Biodegradable polyesters for medical and ecological applications", Macromol. Rapid Commun. 21, No. 3, 2000, pp. 117-132.
Jiang et al., "Surface functionalization of nanostructured silver-coated polyester fabric by magnetron sputtering", Surface & Coatings Technology 204, 2010, pp. 3662-3667.
Kim et al., "Effects of Pretreatment Reagents on the Hydrolysis and Physical Properties of PET Fabrics", Journal of Applied Polymer Science, vol. 112, 2009, pp. 3071-3078.
Kim et al., "Preparation of Surface-Modified Poly(butylene terephthalate) Nonwovens and Their Application as Leukocyte Removal Filters", Wiley Periodicals, 2009, pp. 849-856.
Kotek et al., "Surface Hydrolysis of Filaments Based on Poly(trimethylene terephthalate) Spun at High Spinning Speeds", Journal of Applied Polymer Science, vol. 92, 2004, pp. 1724-1730.
Li et al., "Surface modification of cellulose fibers with layer-by-layer self-assembly of lignosulfonate and polyelectrolyte: effects on fibers wetting properties and paper strength", Cellulose, 2012, pp. 533-546.
Liu et al., "Affinity membrane development from PBT nonwoven by photo-induced graft polymerization, hydrophilization and ligand attachment", Journal of Membrane Science 428, 2013, pp. 562-575.
Ma et al., "Electrospun Poly(Styrene-block-dimethylsiloxane) Block Copolymer Fibers Exhibiting Superhydrophobicity", Langmuir, 2005, pp. 5549-5554.
Ma et al., "Superhydrophobic Fabrics Produced by Electrospinning and Chemical Vapor Deposition", Macromolecules, 2005, pp. 9742-9748.
Ng et al., "Modifications of nonwoven polyethylene terephthalate fibrous matrices via NaOH hydrolysis: Effects on pore size, fiber diameter, cell seeding and proliferation", Process Biochemistry 44, 2009, pp. 992-998.
Raghavanpillai et al., "Hydrophobic and oleophobic surface modification using gelling agents derived from amino acids", Journal of Flourine Chemistry 135, 2012, pp. 187-194.
Ramaratnam et al., "Ultrahydrophobic Textile Surface via Decorating Fibers with Monolayer of Reactive Nanoparticles and Non-fluorinated Polymer", Chemical Communications, 2007, pp. 4510-4512.
Risbud et al., "Preparation, characterization and in vitro biocompatibility evaluation of poly(butylene terephthalate)/wollastonite composites", Biomaterials 22, 2001, pp. 1591-1597.
Saligheh et al., "Poly(Butylene Terephthalate)/Single Wall Carbon Nanotubes Composite Nanofibers by Electrospinning", Journal of Molecular Science, Part B: Physics, 2011, pp. 1031-1041.
Salvagnini et al., "Surface functionalization of a poly(butylene terephthalate) (PBT) melt-blown filtration membrane by wet chemistry and photo-grafting", J. Biomater. Sci. Polymer Edn, vol. 18, No. 12, 2007, pp. 1491-1516.
Shanmuganathan et al., "Solventless High Throughput Manufacturing of Poly(butylene terephthalate) Nanofibers", ACS Publications, 2012, pp. 960-964.
Shin et al., "Extreme water repellency of nanostructured low-surface-energy non-woven fabrics", Soft Matter, The Royal Society of Chemistry, 2012, pp. 1817-1823.
Shukla et al., "Action of Alkali on Polybutylene Terephthalate and Polyethylene Terephthalate Polyesters", Journal of Applied Polymer Science, vol. 75, 2000, pp. 1097-1102.
Tavanaie et al., "Matrix-fibril Morphology Development of Polypropylene/Poly(butylenes terephthalate) Blend Fibers at Different Zones of Melt Spinning Process and Its Relation to Mechanical Properties", Fibers and Polymers, vol. 14, No. 3, 2013, pp. 396-404.
Vasiljevic et al., "The surface modification of cellulose fibres to create super-hydrophobic, oleophobic and self-cleaning properties", Cellulose, 2013, pp. 277-289.
Wei et al., "CF4 plasma surface modification of asymmetric hydrophilic polyethersulfone membranes for direct contact membrane distillation", Journal of Membrane Science 407-408, 2012, pp. 164-175.
Woodfield et al., "Design of porous scaffolds for cartilage tissue engineering using a three-dimensional fiber-deposition technique", Biomaterials 25, 2004, pp. 4149-4161.
Zuo et al., "Nanofibers from Melt Blown Fiber-in-Fiber Polymer Blends", ACS Publications, 2013, pp. 301-305.
Haghighatkish et al. "Alkaline Hydrolysis of Polyester Fibers-Structural Effects," Iranian Journal of Polymer Science and Technology, vol. 1, No. 2, Aug. 2002, pp. 56-61.
International Search Report and Written Opinion Issued for PCT/US2015/010028 dated Apr. 3, 2015, 8 pages.

\* cited by examiner

TUNING SURFACE PROPERTIES OF MELT BLOWN POLYESTER FIBERS BY HYDROLYSIS AND SOLUTION GRAFTING

CROSS-REFERENCE TO RELATED APPLICATIONS

The present application is a U.S. national stage application claiming the benefit of International Application No. PCT/US2015/010028, filed on Jan. 2, 2015, which claims benefit of and priority to U.S. Patent Provisional Application No. 61/980,305, filed on Apr. 16, 2014. The contents of both applications are incorporated herein by reference in their entirety.

BACKGROUND

Poly(butylene terephthalate) (PBT) is a strong semicrystalline thermoplastic. It has excellent thermal and chemical resistance, good dimensional stability, low moisture absorption, and good electrical and mechanical properties. Because of its good processability, PBT is widely used in a variety of applications, most commonly in durable products that are formed by injection molding or extrusion, such as electronic equipment, automotive parts, medical devices, and textiles (Gallucci et al., Poly(butylene terephthalate), *Modern polyesters: Chemistry and Technology of Polyesters and Copolyesters*, 293-322, Wiley: West Sussex, 2003).

As a cost-effective engineering material, nonwoven fibers of PBT have been used for filtration medium (Hutten, Processes for Nonwoven Filter Media, *Handbook of Nonwoven Filter Media*, 195-244, Elsevier: Burlington, Mass., 2007), composite materials (Zuo et al., *ACS Macro Lett.* 2013, 301-305; Doan, V. A.; Nobukawa et al., *Composites Part B* 2012, 43(3), 1218-1223; Saligheh et al., *J. Macromol. Sci., Phys.* 2011, 50(6), 1031-1041; Guo et al., *J. Appl. Polym. Sci.* 2013, 12 (6), 3652-3659; Kim et al., *J. Biomed. Mater. Res. Part B Appl. Biomater* 2009, 849-856; Risbud et al., *Biomaterials* 2001, 22(12), 1591-1597), and tissue scaffolds (Catalani et al., *Macromolecules* 2007, 40(5), 1693-1697; Woodfield et al., *Biomaterials* 2004, 25(18), 4149-4161; Ikada et al., *Macromol. Rapid Commun.* 2000, 21(3), 117-132; Hollister et al., *Nat. Mater.* 2005, 4(7), 518-524). They can be fabricated by melt blowing (Ellison et al., *Polymer* 2007, 48(11), 3306-3316), electrospinning (Saligheh et al., *J. Macromol. Sci., Phys.* 2011, 50(6), 1031-1041), melt spinning (Chen et al., *J. Appl. Polym. Sci.* 1987, 33(4), 1427-1444), and forcespinning (Shanmuganathan et al., *ACS Macro Lett.* 2012, 1(8), 960-964).

Among these techniques, melt blowing is of particular interest, because it does not require solvent. It is widely used and applicable to many polymers. A typical melt blowing process starts with extrusion of a molten polymer through a die. Jets of hot air entrain the molten polymer filament and rapidly extend its length with concomitant reduction in diameter. A significant amount of ambient air, which is entrained by the hot jets, leads to rapid cooling of the fiber below its solidification temperature (i.e. glass transition temperature or crystallization temperature). Thus fibers are formed between the extrusion temperature and solidification temperature, and finally fiber mats are collected on a static or continuous screen.

Although PBT nonwoven fibers have found uses in a variety of fields, its surface properties, such as wetting, biocompatibility, and adsorption, may not meet the requirements for various applications. Therefore, surface modification plays an important role in improving the surface properties and enhancing the performance of PBT nonwoven fibers. Several techniques have been applied to impart either enhanced hydrophilicity or superhydrophobicity to PBT or other polymeric fibers, such as coating with hydrophilic/hydrophobic chemicals or particles (U.S. Pat. No. 7,524,425; Ramaratnam et al., *Chem. Commun.* 2007, (43), 4510-4512; U.S. Pat. No. 7,842,624; Shin et al., *Soft Matter* 2012, 8(6), 1817-1823), physical vapor deposition (PVD) (Jiang et al., *Surf. Coat. Technol.* 2010, 204(21-22), 3662-3667; Huang et al., *J Mater Sci* 2007, 42(19), 8025-8028), chemical vapor deposition (CVD) (Ma et al., *Macromolecules* 2005, 38(23), 9742-9748), blending in low-surface-energy additive (Hardman et al., *Macromolecules* 2011, 6461-6470), copolymerization (U.S. Pat. No. 7,736,516; Ma et al., *Langmuir* 2005, 21(12), 5549-5554), surface grafting (Fareghi et al., *Iran. Polym. J.* 2013, 22(5), 361-367; Bongiovanni et al., *Colloids Surf, A* 2013, 418(0), 52-59), layer-by-layer (LBL) deposition (Li et al., *Cellulose* 2012, 19(2), 533-546), sol-gel technique (Vasiljević et al., *Cellulose* 2013, 20(1), 277-289; Raghavanpillai et al., *J. Fluorine Chem.* 2012, 135(0), 187-194), and plasma treatment (Fernández-Blázquez et al., *Adv. Colloid Interface Sci.* 2011, 357(1), 234-238; Wei et al., *J. Membr. Sci.* 2012, 407-408 (0), 164-175; Salvagnini et al., *J. Biomater. Sci., Polym. Ed.* 2007, 18(12), 1491-1516; Gérard et al., *J. Polym. Sci., Part A: Polym. Chem.* 2011, 49(23), 5087-5099; Liu et al., *J. Membr. Sci.* 2013, 428(0), 562-575).

The modifications of fiber mats are described in U.S. Pat. Nos. 3,017,685; 3,096,557; 3,111,359; 3,135,577; 3,287,787; 4,008,044; 4,803,256; 4,842,792 and 5,124,205. In addition, alkaline hydrolysis has been studied on poly(ethylene terephthalate) (PET) fabrics to modify their surface wetting property (Ng et al., *Process Biochem.* 2009, 44(9), 992-998; Hadjizadeh et al., *J. Mech. Behav. Biomed. Mater.* 2010, 3(8), 574-583; Shukla et al., *J. Appl. Polym. Sci.* 2000, 75(9), 1097-1102; Dave et al., *J. Appl. Polym. Sci.* 1987, 33(2), 455-477; Holmes et al., *J. Appl. Polym. Sci.* 1995, 55(11), 1573-1581; Kotek et al., *J. Appl. Polym. Sci.* 2004, 92(3), 1724-1730; Tavanai et al., *J. Text. Inst.* 2009, 100(7), 633-639; Kim et al., *J. Appl. Polym. Sci.* 2009, 112(5), 3071-3078). However, it was unknown whether alkaline hydrolysis is applicable to the modification of PBT nonwoven fibers, as PBT woven fabrics are more resistant to sodium hydroxide solutions than PET woven fabrics (Shukla et al., *J. Appl. Polym. Sci.* 2000, 75(9), 1097-1102).

SUMMARY

Various embodiments described herein relate to a method for modifying a polyester and polyester based fiber, such as a poly(butylene terephthalate) (PBT) fiber. The method comprises subjecting said polyester fiber to alkaline hydrolysis, and further functionalizing the polyester fiber by solution grafting and/or fluorination to obtain a functionalized fiber. In one embodiment, the polyester fiber is treated with sodium hydroxide. The modification of the polyester and polyester based fiber may comprise (1) surface properties including surface topology and surface wetting; and (2) diameter properties including an average fiber diameter and a fiber diameter distribution of the polyester and polyester-based fiber.

In some embodiments, the method further comprises functionalizing the hydrolyzed polyester fiber by solution grafting. In one embodiment, the method further comprises functionalizing the hydrolyzed polyester fiber by fluorination.

In some embodiments, the polyester fiber is a nonwoven fiber. In some embodiments, the polyester fiber is a part of a melt-blown fiber mat comprising PBT and, optionally, poly(ethylene terephthalate) (PET) and/or poly(lactic acid) (PLA).

Other embodiments relate to a nonwoven polyester fiber mat obtained by the methods described herein. In one embodiment, the nonwoven polyester fiber mat comprises a superhydrophilic surface. In another embodiment, the nonwoven polyester fiber mat comprises a superhydrophobic surface.

Additional embodiments relate to a filtration device comprising the nonwoven polyester fiber mat described herein. In one embodiment, the filtration device is adapted for crankcase ventilation coalescing applications.

These and other features, together with the organization and manner of operation thereof, will become apparent from the following detailed description when taken in conjunction with the accompanying drawings

DETAILED DESCRIPTION

Figure 1:
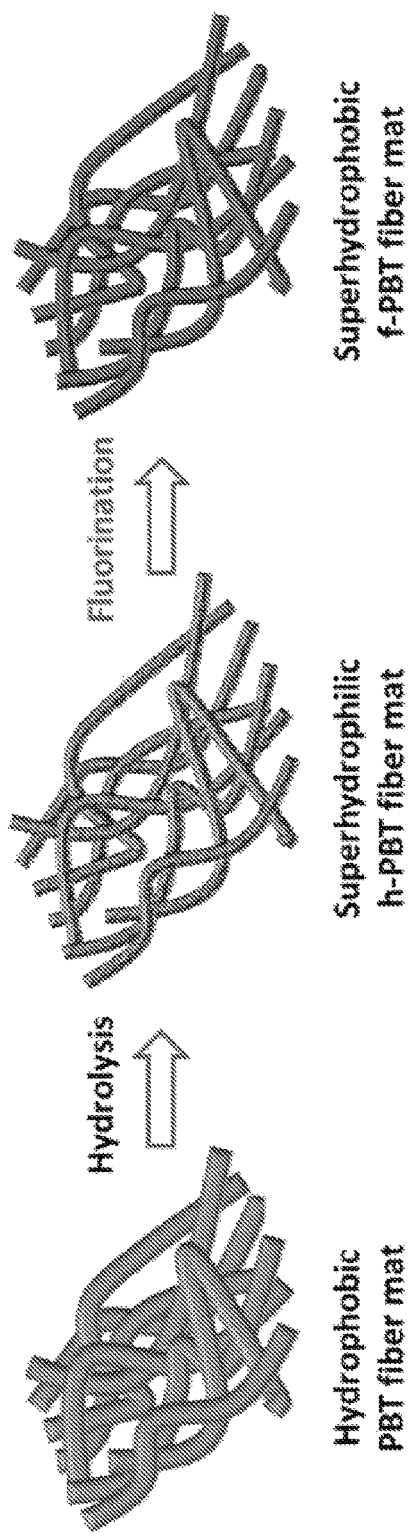
FIG. 1 is a schematic overview of an exemplary embodiment of the hydrolysis and fluorination treatment of a PBT fiber mat. The hydrolysis can be controlled by treatment temperature, time, and concentration.

The polyester fiber mat described herein can be treated by a method comprising subjecting the polyester fiber to hydrolysis, such as alkaline hydrolysis, wherein the hydrolysis modifies the surface morphology of the polyester fiber.

The alkaline hydrolysis can be conducted with, for example, a sodium hydroxide solution. The sodium hydroxide solution can comprises, for example, water, at least one alcohol such as methanol, or a mixture thereof.

The alkaline hydrolysis can be conducted at a temperature of, for example, 20-100° C., or 30-80° C., or 40-60° C. The alkaline hydrolysis can be conducted for period of, for example, 5-240 min, or 10-120 min, or 15-60 min, or 20-45 min.

The polyester fiber mat can comprise, for example, a nonwoven polyester fiber. The polyester fiber mat can comprise, for example, a melt-blown polyester fiber. The polyester fiber mat can comprise, for example, a nonwoven melt-blown polyester fiber.

The polyester fiber mat can comprise, for example, a nonwoven melt-blown fiber made by melt blowing a PBT media. The PBT polymer in said media can have weight-average molecular weight of, for example, about 35000-75000 g/mol.

The polyester fiber mat can comprise, for example, a nonwoven melt-blown fiber made by melt blowing a blend of PBT and PET and/or PLA. The weight percentage of PET in said blend can be, for example, 1-20%, or 2-15%. The PET polymer in said blend can have weight-average molecular weight of, for example, about 40000-80000 g/mol, while the PBT polymer in said blend can have weight-average molecular weight of, for example, about 35000-75000 g/mol.

The polyester fiber can comprises, for example, a polymer comprising at least one ester bonds which could be hydrolytically cleaved. The polyester fiber can comprise, for example, co-polyester available from Eastman, polycaprolactone, polyester-based polyurethane, and acrylate polymers with ester side groups.

The polyester fiber can have, for example, a crystallinity of at least 20%, or at least 25%, or at least 30%.

The hydrolyzed polyester fiber mat can be, for example, hydrophilic. The hydrolyzed polyester fiber mat can have a reduction in $d_a$ of, for example, at least 20%, or at least 30%, or at least 50%. The hydrolyzed polyester fiber mat can have a $d_{av}$ of, for example, 100-900 nm, or 150-800 nm, or 200-700 nm, or 250-600 nm, or 300-500 nm. The hydrolyzed polyester fiber mat can have an increase of coefficient of variation (CV) of, for example, at least 20%, or at least 30%, or at least 50%, or at least 80%, or at least 100%. The hydrolyzed polyester fiber mat can have a CV of, for example, 0.3-1.0, or 0.5-0.9, or 0.6-0.8.

The hydrolyzed polyester fiber mat can comprise, for example, hydroxyl surface groups. The hydrolyzed polyester fiber mat can comprise, for example, carboxyl surface groups.

The hydrolyzed polyester fiber mat can be further functionalized by, for example, solution grafting. The hydrolyzed polyester fiber mat can be further functionalized by, for example, fluorination.

The hydrolyzed polyester fiber mat can be further functionalized by, for example, solvent and/or water borne chemistry that utilizes hydrogen or covalent bonding with the hydroxyl or carboxyl groups. The inclusion of these function groups mean that durable additions can be applied to PBT and PBT/PET fibers. Durable additions of chemical species include hydrophobic and hydrophilic treatments and also many forms of reactive groups or antimicrobial and anti-fouling materials useful for the preservation of filter performance when used as filter, coalescing medium, or water or separating device. The functional groups imposed on the surface would also allow for cross linked bonds with a thermoplastic or thermosetting resin addition.

The functionalized polyester fiber mat can be, for example, hydrophobic. The functionalized polyester fiber mat can have, for example, a water contact angle (CA) of more than 130°, or more than 140°, or more than 150°. The functionalized polyester fiber mat can be, for example, oleophilic. The functionalized polyester fiber mat can also be, for example, hydrophilic.

The functionalized polyester fiber mat can comprise, for example, 1-20 atom %, or 1-10 atom %, or 2-8 atom %, or 3-7 atom % of fluorine on its surface.

In one example, melt blown PBT fiber mats were exposed to NaOH solution resulting in super hydrophilic surface, reduced fiber size, increased fiber roughness. Following hydrolysis, simple solution chemistry was applied to fluorinate the surface of hydrolyzed PBT fibers resulting in super hydrophobic mats. In addition to the reduced fiber diameters, a useful increase in the variance of the fiber diameter distribution is produced in this process. In addition to the unique surface chemistry resulting from the process, the fiber diameter distribution is reduced on average and the coefficient of variation (CV) increased significantly. Higher CV fiber diameter distribution materials based on PBT fibers have been sought after for crankcase ventilation coalescing applications. The nonwoven materials resulting from this process satisfies this need.

In addition, other methods of producing PBT fibers through melt blowing processes or centrifugal spinning processes have certain limitations. Fiber production throughput is one limitation. The inclusion of functional materials as a blend or compounded polymer could result in functional materials that are within the fiber rather than the surface of the fiber resulting in reduced effectiveness of the functional material. The process described herein could enable a higher throughput of production submicron PBT fiber mat material per unit of energy (J/kg) or power (W/kg) required to form the mat. It could also result in reduced quantities of functional material required. and in many cases the functional material is a much higher unit cost than the base polymer. Finally with a stronger covalent bond functional materials will be much more durable than surface coatings. Fiber mats with wide fiber diameter distribution have been made by mixing relatively short length fibers from separate production lines or production runs. Glass fiber material and air laid or needle-punched polymer fiber materials lack the uniformity and resistance to shedding or migration of filaments during use of the mats in various applications, including filtration.

Application of the fiber mat described herein with either hydrophilic or hydrophobic mats (or both types of mats in successive layers) to crankcase ventilation filtration yields a higher quality factor of aerosol separation during transient and steady state (oil saturated) operation.

Application of the fiber mat described herein to fuel filtration media, in conjunction with one or more polymeric nanofiber media layers downstream, which have significantly smaller maximum pore size or 95% percentile pore size to mean pore size ratio than the exposed PBT mats, results in a longer life, high efficiency fuel filtration media when exposed to polydisperse fuel system contaminants wherein at least 90% of contaminant particle mass is below about 5-12 microns in size.

WORKING EXAMPLES

The following examples describe the modification of surface wetting property of PBT melt blown fibers by sodium hydroxide (NaOH) hydrolysis and subsequent fluorination. PBT melt blown fibers were fabricated soaked in NaOH solution. After hydrolysis, a simple fluorination was conducted. Effects of NaOH hydrolysis on fiber surface morphology, average fiber diameter, mass loss, and structural integrity of the fiber mats were evaluated. Sessile drop measurements revealed that superhydrophilicity was achieved by hydrolysis and superhydrophobicity was obtained by subsequent fluorination. The approach of hydrolysis followed by simple fluorination offers an easy way to tune surface properties of PBT and other polyester fibers.

Example 1—Fabrication of Melt Blown PBT Fibers

PBT pellets (Celanex 2008, Ticona) were used to fabricate melt-blown fibers. The pellets were dried at 100° C. in vacuum for 12 hours before melt blowing. Melt blowing was performed by a lab-scale melt blowing apparatus. It was constructed by fitting a homemade melt blowing die and a fiber collector to a capillary rheometer (Goetffert Rheo-Tester 1500). The melt blowing die, which mimics the configuration of an industrial die named Exxon die (U.S. Pat. No. 3,825,380), had five die holes with each hole having a diameter of 0.2 mm. The fiber collector, which consists of a stainless steel screen and a blower, was located 35 cm away from the melt blowing die. The fabrication was carried out at 265° C. Polymer flow rate was set to 0.18 g/(min·hole), and air volumetric flow rate was controlled at 4.5 SCFM. Air pressure at die exit was kept at about 6 psi.

Example 2—NaOH Treatment of PBT Fibers

Melt blown PBT fiber mats were cut into small square pieces (1×1 $cm^2$, thickness ~1 mm). Then, the fiber mats were soaked in methanol solution of NaOH in a glass vial without stirring. Methanol solution of NaOH was used because alcoholic solution of alkali can accelerate hydrolytic action on polyester (Shukla et al., *J. Appl. Polym. Sci.* 2000, 75(9), 1097-1102). NaOH solution was prepared by dissolving 0.5 g NaOH pellets (Macron Fine Chemicals) into a mixed solvent of methanol (Fisher Scientific) and deionized water (2 mL:2 mL, pH=7). The NaOH solution was preheated to different temperatures (45, 50, 55° C.) before soaking PBT fiber mats. At each temperature, the treatment duration was varied (10, 20, 30 min). After hydrolysis, the fiber mats were washed three times with distilled water and then immersed in HCl solution (~0.1 mol/L). Then, they were washed again with distilled water until pH=7. Finally, the hydrolyzed PBT (h-PBT) fiber mats were dried in the hood for 24 hours, followed by vacuum drying at 20° C. overnight. All experiments were triplicated and representative data were reported.

Example 3—Fluorination of h-PBT Fibers

A piece of h-PBT fiber mat (treated at 45° C. for 20 min) was soaked in dimethyl sulfoxide (DMSO) (Sigma-Aldrich) at 80° C. for 24 hours. 30 mg 1H, 1H-perfluorooctylamine (PFOA) (Fisher Scientific) and about 15 mg 4-(4,6-Dimethoxy-1,3,5-triazin-2-yl)-4-methylmorpholinium chloride (DMTMM) (Sigma-Aldrich) were dissolved into mixture of DMSO (6 mL) and methanol (2 mL) with rigorous stirring. The solution was preheated to 50° C. Then, h-PBT fiber mat was immersed into the solution 2 hours. After that, the fluorinated h-PBT (f-PBT) fiber mat was repeatedly washed with methanol and then distilled water. Finally, f-PBT fiber mat was dried in the vacuum for 24 hours.

Example 4—Characterization of Fiber Mats and Fibers

Size of the fiber mats was evaluated and photographed. Mass of h-PBT fiber mats were weighed using an electric analytical balance (Denver Instrument M-220). Before each measurement, the fiber mats were vacuum dried at 20° C. overnight. Mass loss ($\Delta m$ %) of the fiber mats was calculated according to equation (1), $$\Delta m\ \% = \frac{m_o - m}{m_o} \times 100\% \quad (1)$$

where $m_0$ is the mass of the original untreated fiber mat, m is the mass of h-PBT fiber mat. Porosity ($\epsilon$) of the fiber mats was estimated with equation (2) (Barhate et al., *J. Membr. Sci.* 2006, 283(1), 209-218), $$\varepsilon = \left(1 - \frac{\frac{w}{Az}}{\rho_{fibers}}\right) \quad (2)$$

where $\epsilon$ is the porosity of the fiber mat, w is the weight of the fiber mat, A and z are the area and thickness of the mat, and $\rho_{fibers}$ can be considered equal to the density of PBT (1.4 g/cm$^3$).

Thermal properties of both PBT and h-PBT fibers were analyzed by a differential scanning calorimetry (TA Instrument Q1000). The samples were pre-dried in vacuum at 20° C. overnight. Heating and cooling scans were controlled from 0 to 250° C. at a constant rate of 10° C./min. Crystallinity ($X_c$) was derived from equation (3), $$X_c = \frac{\Delta H_f}{\Delta H_f^\circ} \quad (3)$$

where $\Delta H_f$ represents the heat of fusion of the melting peak, $\Delta H_f^\circ$ indicates the heat of fusion of 100% crystallinity of PBT and is equal to 140 J/g (Illers et al., *Colloid. Polym. Sci.* 1980, 258(2), 117-124).

Fiber morphology was determined by a scanning electron microscope (SEM) (Hitachi S-4700). Before SEM analysis, fiber mats were coated with gold/palladium for 30 seconds using a Denton DV-502 sputter coater. For each fiber mat, 25-35 representative SEM micrographs were taken and 400-500 fiber diameter measurements were made using ImageJ software. Origin Lab software was employed to analyze the lognormal distribution of the fiber diameters and to calculate the average fiber diameter ($d_{av}$) and coefficient of variation (CV). The coefficient of variation (CV) is defined as the ratio of the standard deviation $\sigma$ to the mean $\mu$: $c_v = \sigma/\mu$. It shows the extent of variability in relation to mean of the population.

X-ray photoelectron spectroscopy (XPS) (Surface Science SSX-100) was conducted to determine the surface chemical composition of both h-PBT and f-PBT fiber mats. A monochromatic Al K$\alpha$ source with a spot size of 1 mm was applied at a take-off angle of 35°. The pressure of the analysis chamber was maintained at 10$^{-10}$ Torr. Survey spectra (6 scans/sample, 0-1100 eV binding energy) were recorded at a rate of 1 eV/step. The data was processed by Hawk Data Analysis 7 software.

Surface wetting property of the fiber mats was evaluated by sessile drop measurement using a FAMAS Interface Measurement & Analysis system (KYOWA, DM-CE1). For PBT and h-PBT fiber mats, static contact angle (CA) was measured by placing a 5 µL water droplet onto the mats. Then, images were recorded with a CCD camera. For f-PBT fiber mat, a 7 µL water droplet was used for both static and slide-off angle measurement, and images were captured. Five measurements were made for each sample and the average value was taken.

Example 5—Size and Integrity of PBT Fiber Mats

Figure 2:
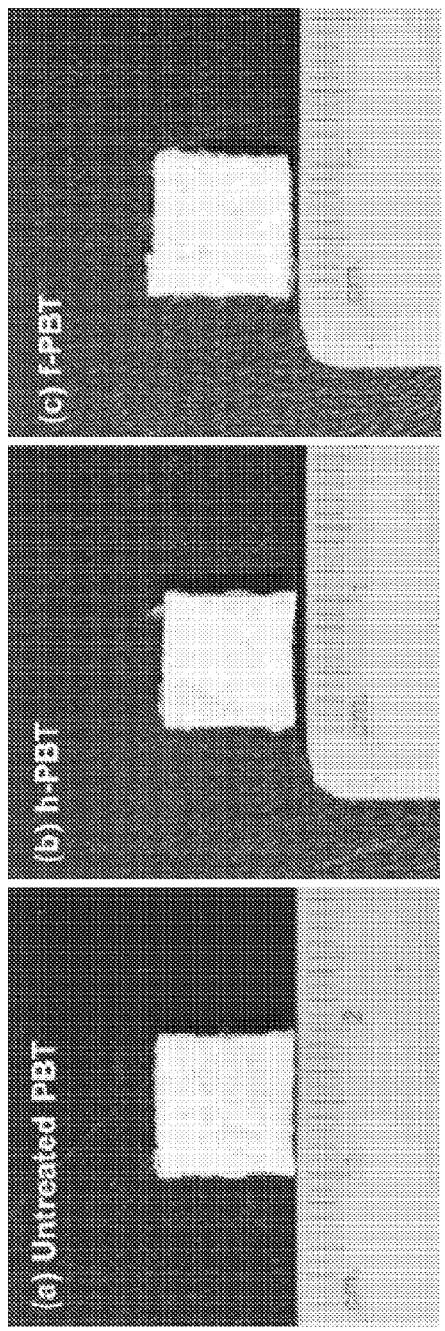
FIG. 2 shows fiber mats of (a) untreated PBT, (b) h-PBT treated at 45° C. for 20 min, and (c) f-PBT.

Size and integrity of PBT fiber mats changed little during NaOH treatment, independent of the treatment temperature and duration in all of the experiments. As shown in the representative photographs in FIG. 2, the size of h-PBT fiber mat treated at 45° C. for 20 min is nearly the same as that of the original fiber mat. This is different from the cases of PET fabrics treated by water solution of NaOH. PET fabrics showed shrinkage behavior after NaOH treatment. It was reported that the shrinkage depended on crystallinity of the fibers, the treatment duration and temperature, the fiber diameter, and the fabric structure (Hadjizadeh et al., *J. Mech. Behav. Biomed. Mater.* 2010, 3(8), 574-583; Kim et al., *J. Appl. Polym. Sci.* 2009, 112(5), 3071-3078). Comparing with the study of Hadjizadeh et al. on PET melt blown fiber mats hydrolyzed by water solution of NaOH, the untreated PBT melt blown fibers possess higher crystallinity ($Xc=30.8\%$) than PET fibers ($Xc=15\%$), as PBT crystallizes faster than PET (Chuah et al., *Polym. Eng. Sci.* 2001, 41(2), 308-313). Due to higher crystallinity, recrystallization which can lead to fiber shrinkage was not observed, as shown in the DSC curves in FIG. 3(*a*). Another reason contributing to the retaining of the original size and integrity is that the duration was not too long and the treatment was not too severe, therefore the fibers were not completely hydrolyzed and disappeared. It is believed that both the high crystallinity and mild hydrolysis conditions played critical roles in maintaining the original size and integrity of the fiber mats.

Figure 3B:
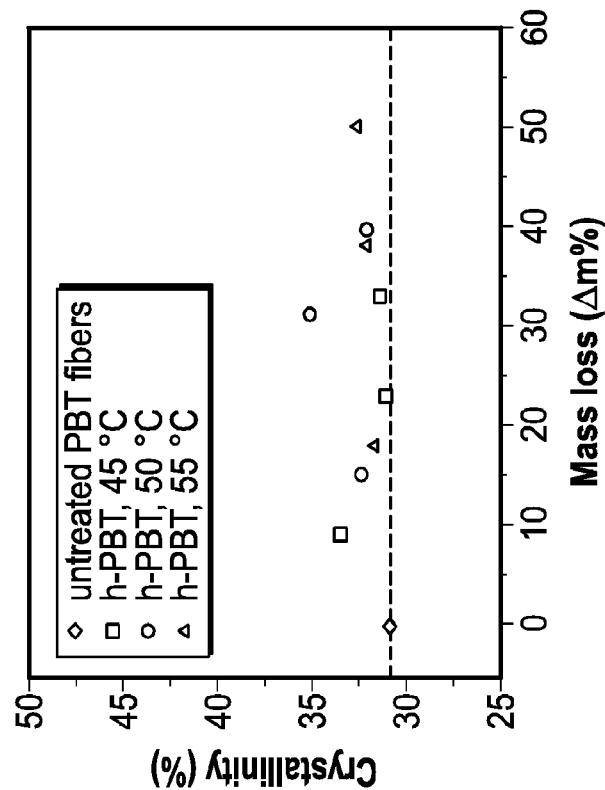
FIG. 3 shows thermal analysis of (a) PBT and representative h-PBT fibers, and (b) hydrolysis effect on crystallinity ($X_c$).
Figure 3A:
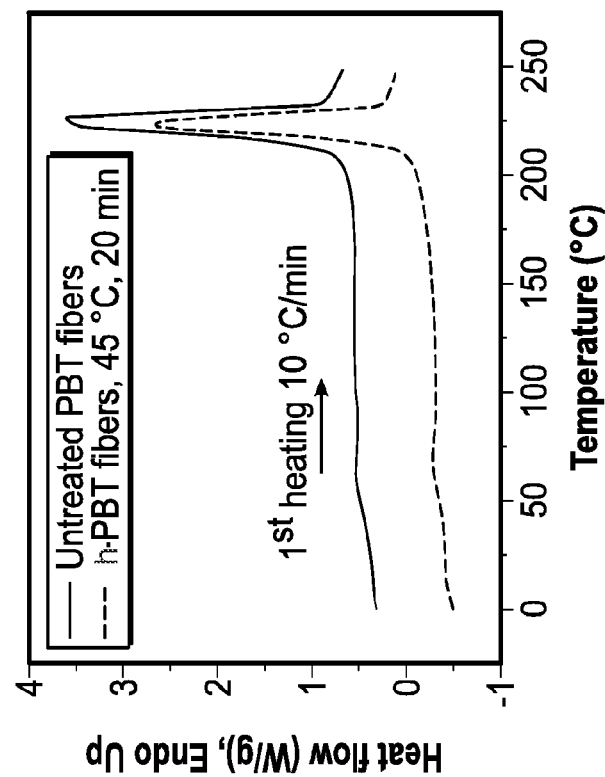

In addition, thermal analysis showed little effect of hydrolysis on crystallinity of the fibers. As indicated in FIG. 3(*b*), the data are scattered but show a slight increase in crystallinity with hydrolysis. This may be due to preferential hydrolysis of the amorphous regions of PBT. Another possible reason is solvent-induced crystallization arising from enhanced mobility of swollen polymer chains during etching (Burkersroda et al., *Biomaterials* 2002, 23(21), 4221-4231). In contrast, single poly(lactide) (PLA) or poly(glycolic acid) (PGA) fibers showed linear increase in crystallinity with hydrolysis (Sun et al., *ACS Appl. Mater. Interfaces* 2009, 1(7), 1572-1578; Ginde et al., *J. Appl. Polym. Sci.* 1987, 33(7), 2411-2429). The geometric structure of the fiber mat might have affected the mobility of swollen chains and thus influenced the crystallinity changes.

Example 6—Mass Loss and Fiber Diameter

NaOH hydrolysis led to mass loss. One possible mechanism of PBT alkaline hydrolysis is shown below. Hydroxide ions (OH—) attacked carbonyl carbons of the ester linkage and breaked PBT chains, forming a carbonate salt of sodium, 1,4-butanediol, and fragmented polymer chains with carboxyl or hydroxyl end groups (Goje et al., *Chemical Engineering & Technology* 2004, 27(7), 790-799).

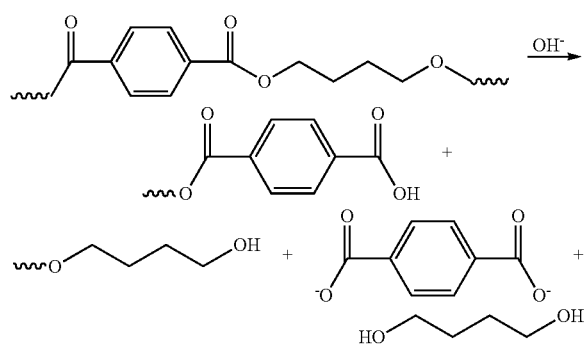

Figure 4:
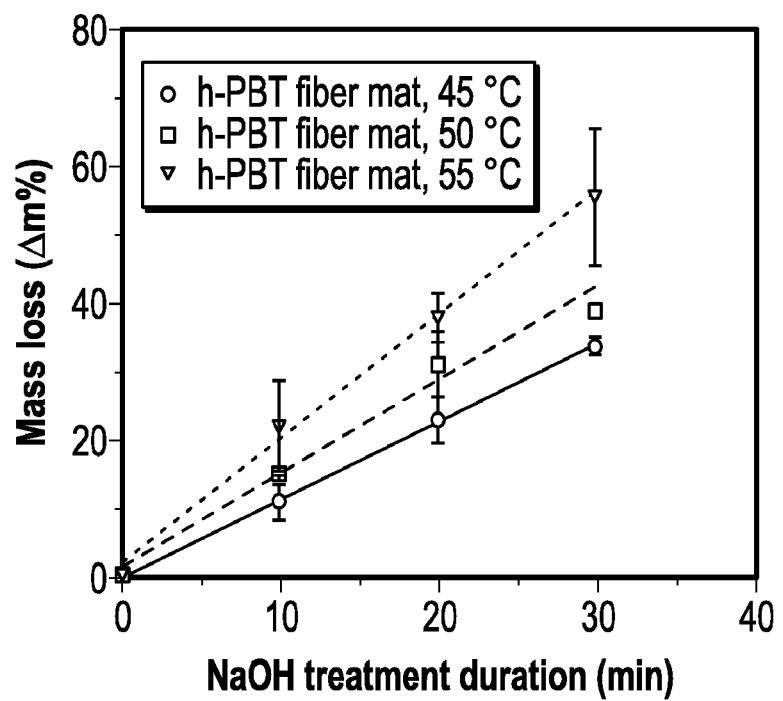
FIG. 4 shows mass loss ($\Delta m$ %) of h-PBT fiber mats.

As shown in FIG. 4, it seems that mass loss (Δm %) of h-PBT fiber mats increased almost linearly with increasing treatment time at a constant temperature. This linear dependence of mass loss on treatment duration was also reported for NaOH hydrolysis of both PET-cotton spun fabric and PET woven fabrics (Shukla et al., *J. Appl. Polym. Sci.* 2000, 75(9), 1097-1102; Dave et al., *J. Appl. Polym. Sci.* 1987, 33(2), 455-477; Namboori et al., *J. Appl. Polym. Sci.* 1968, 12(9), 1999-2005), but is in contrast to the non-linearity for PET melt blown fiber mats and a single PLA fiber (Hadjizadeh et al., *J. Mech. Behav. Biomed. Mater.* 2010, 3(8), 574-583; Sun et al., *ACS Appl. Mater. Interfaces* 2009, 1(7), 1572-1578). It has been demonstrated that alkaline hydrolysis of both PET fabric and single PLA fibers is surface reaction and follows the second-order surface degradation kinetics (Ng et al., *Process Biochem.* 2009, 44(9), 992-998; Sun et al., *ACS Appl. Mater. Interfaces* 2009, 1(7), 1572-1578). Therefore, this seemingly linear dependence existed virtually for short treatment duration but actually followed a second-order relationship as the hydrolysis proceeds, depending on the concentration of OH—, geometrical structure of the fabric, and fiber diameter.

Also, as observed in FIG. 4, mass loss increased with the increase of temperature at equal treatment duration. This is attributed to the increased reaction rate and mobility of the fragmented chains, speeding up these short chains to go into the solution and thus leading to more mass loss. In addition, as the hydrolysis proceeded, porosity (ε) of h-PBT fiber mats increased to 97.4% in comparison with 94.1% of the untreated PBT fiber mat.

Figure 5B:
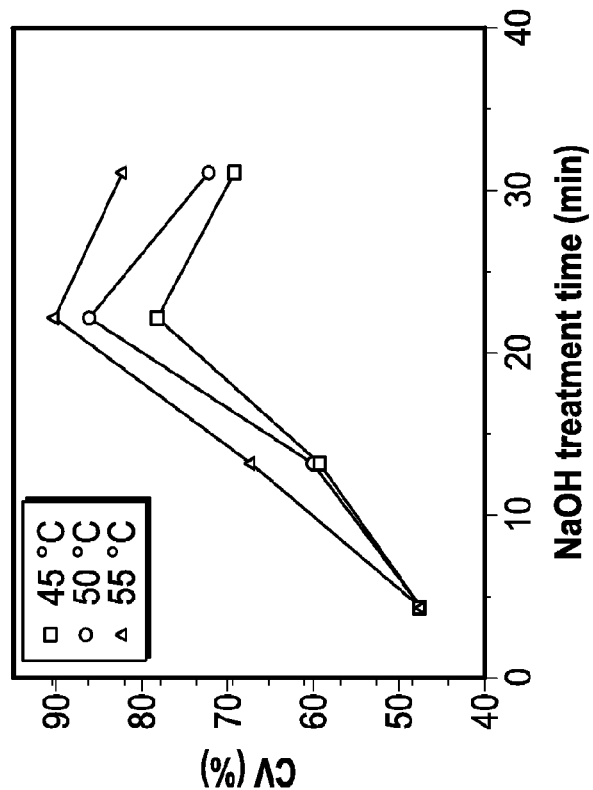
FIG. 5 shows hydrolysis effect on (a) $d_{av}$ and (b) coefficient of variance (CV). Though fiber diameter was reduced, the coefficient of variance increased significantly which could be useful for CV coalescers.
Figure 5A:
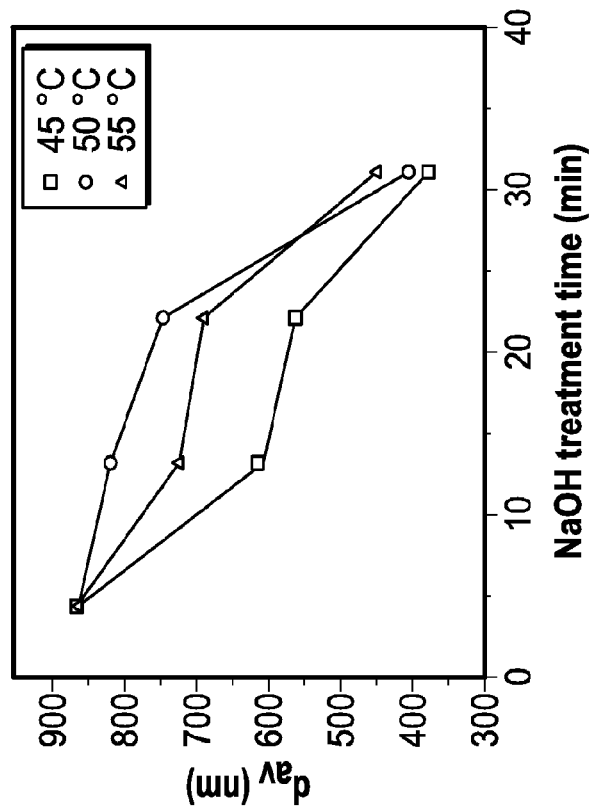
Figure 6A:
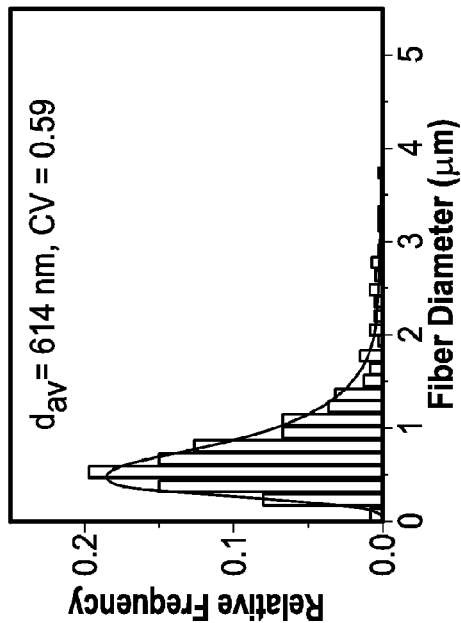
FIG. 6 shows representative fiber diameter distributions of (a) untreated PBT fibers, (b) h-PBT fibers treated at 45° C. for 10 min, (c) h-PBT treated at 45° C. for 20 min, and (d) h-PBT treated at 45° C. for 30 min.
Figure 6B:
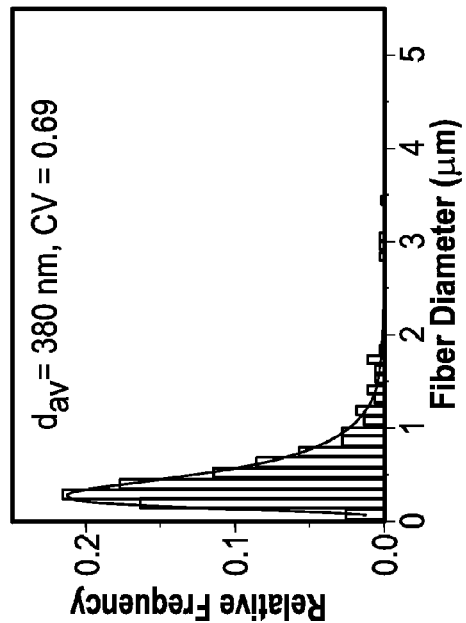
Figure 6C:
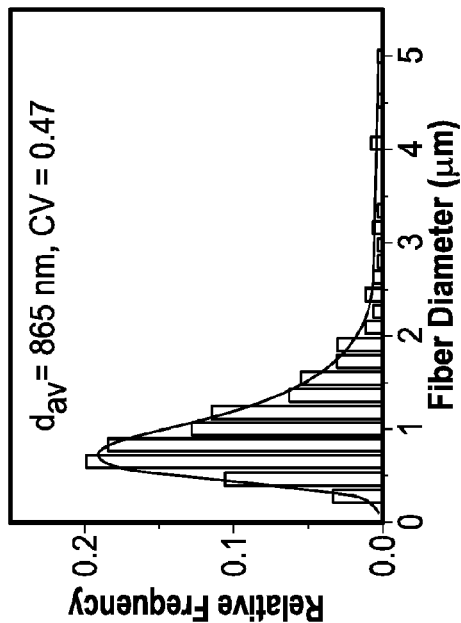
Figure 6D:
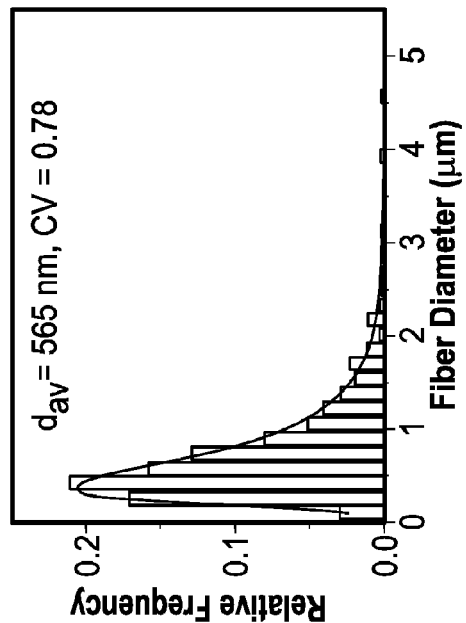

Surface hydrolysis also led to a decrease of the fiber diameter and affected the fiber diameter distribution (CV). As shown in FIG. 5, the average fiber diameter ($d_{av}$) decreased as the hydrolysis proceeded at a constant temperature. Comparing with the untreated PBT fibers, $d_{av}$ decreased from 865 nm to as small as 380 nm. This decrease in fiber diameter shows that NaOH hydrolysis is a surface reaction. Also, hydrolysis seems to be accelerating at 30 min. On the other hand, CV increased but finally decreased, which is possibly due to the loss of smallest fibers. It is believed that the initial non-homogeneity ($CV_{initial}$=47%) of the fiber mats, which was not controlled in the fabrication process, also affected the change of both $d_{av}$ and CV. Since hydrolysis occurred on fiber surface, it had more significant effect in decreasing the diameter of small fibers with large specific surface area than it did for big fibers. Therefore, the fiber diameter distribution shifted to small diameter regions while the coefficient of variation increased, as shown in the representative graphs in FIG. 6.

Example 7—Surface Morphology

Figure 7:
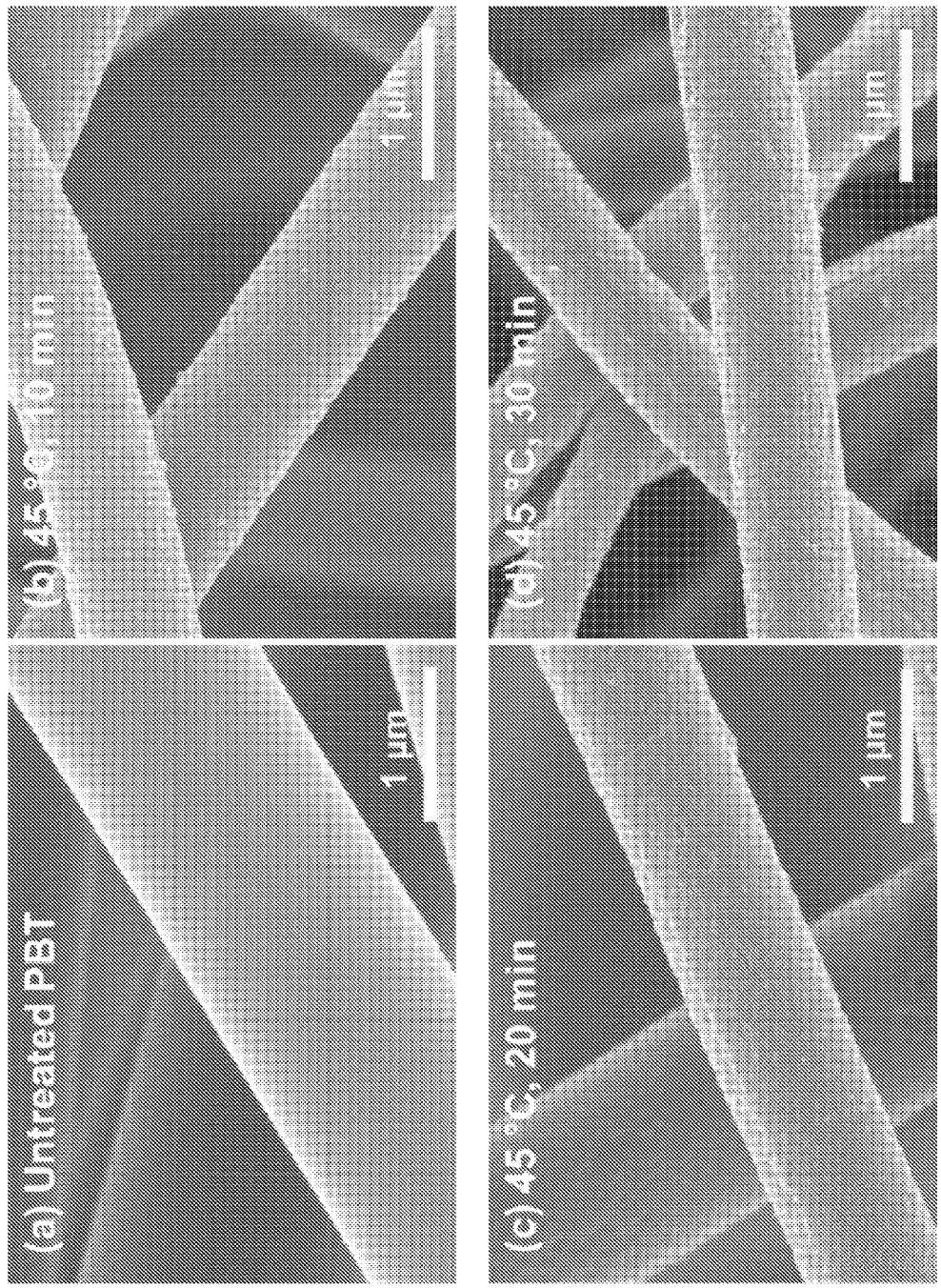
FIG. 7 shows SEM images of (a) untreated PBT fibers ($d_{av}$=865 nm), (b) h-PBT fibers treated at 45° C. for 10 min, (c) h-PBT fibers treated at 45° C. for 20 min, and (d) h-PBT fibers treated at 45° C. for 30 min ($d_{av}$=380 nm). The hydrolysis occurred substantially uniformly, leading to increased surface roughness and reduced fiber diameter.

NaOH hydrolysis made significant changes in the surface morphology of PBT fibers. As shown in the SEM images in FIG. 7, comparing with the relatively smooth surface of untreated PBT fibers, h-PBT fibers exhibit a textured, sponge-like surface. This is because hydrolysis occurred on PBT fiber surface and thus etched the fiber surface uniformly. Hydrolysis might have occurred randomly without any preference on the surface. But the degree of hydrolysis along the fiber surface was not homogeneous. It is believed that the amorphous and low-crystallinity regions more readily reacted with OH—, which was also reported in other studies (Ng et al., *Process Biochem.* 2009, 44(9), 992-998).

Therefore, these regions were hydrolyzed at a faster rate. However, surface pores, which were reported in NaOH treated PET melt blown fibers (Kim et al., *J. Biomed. Mater. Res. Part B Appl. Biomater* 2009, 849-856), were not observed. It is probably because PBT is more resistant than PET to OH— attack. As the treatment duration increased, surface roughness seemed to become more severe, but still sponge-like. In addition, varying the treatment temperature, there is no notable change on surface roughness (Fiber morphology of h-PBT treated at 50° C. and 55° C. is provided in Supporting Information). Thus, the treatment duration might have played a more critical role in creating surface roughness than the treatment temperature.

Example 8—Superhydrophilicity of h-PBT Fiber Mats

Figure 8:
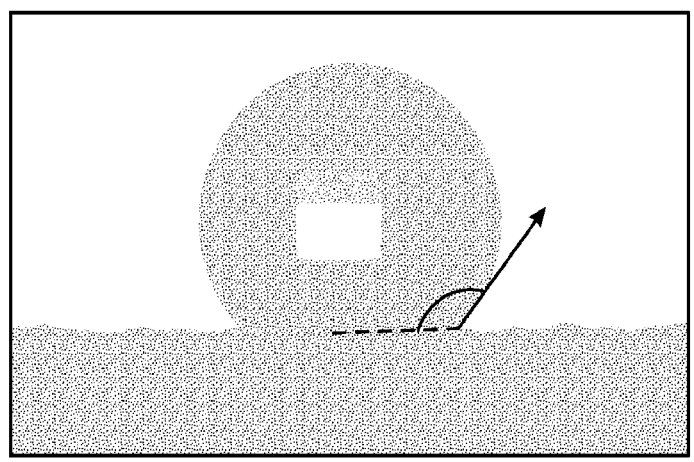
FIG. 8 shows sessile drop measurement on untreated PBT fiber mat, $CA_{PBT\ fiber\ mat}$=126±4°.

Surface hydrolysis changed not only the surface morphology of PBT fibers but also the surface wetting property of the fiber mats. According to the definition of hydrophobic materials ($CA_{hydrophobic}$>90°) (Quéré et al., *Phil. Trans. R. Soc. A* 2008, 366 (1870), 1539-155), PBT melt blown fiber mat exhibited hydrophobic surface with $CA_{PBT}$ fiber mats=126±4° because of surface roughness of the fiber mat (Cassie et al., *Trans. Faraday Soc.* 1944, 40 (0), 546-551), as shown in the photograph in FIG. 8.

Figure 9A:
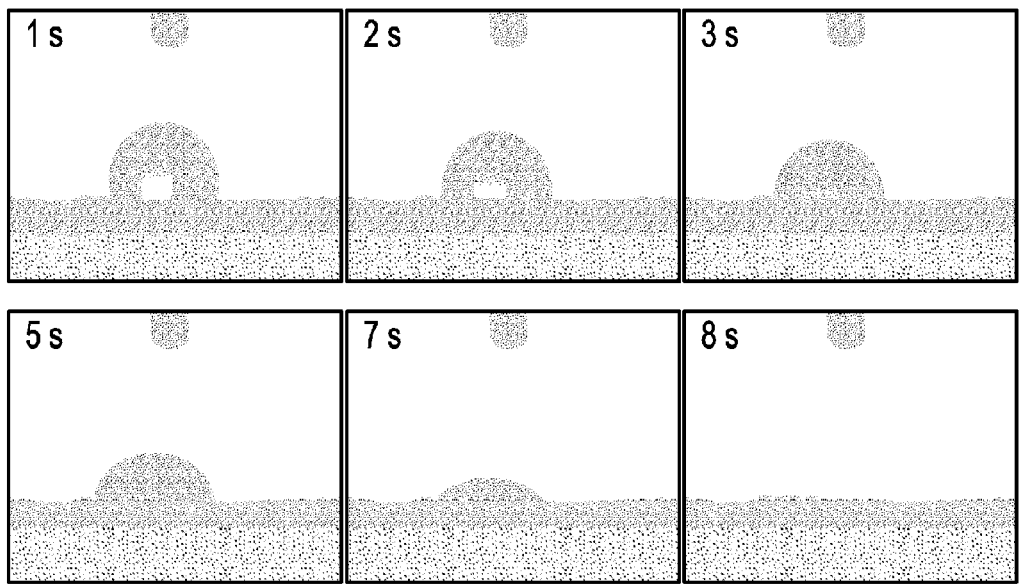
FIG. 9 shows sessile drop measurement on h-PBT fiber mats treated: (a) at 45° C. for 10 min, and (b) at 45° C. for 20 min.
Figure 9B:
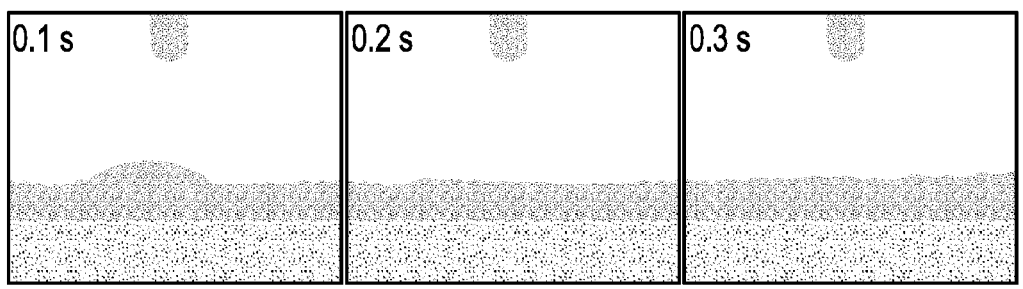

After NaOH hydrolysis, the surface hydrophilicity of PBT fiber mat was significantly enhanced. As shown in FIG. 9, water droplets were spontaneously sucked into h-PBT fiber mats, showing improved hydrophilicity and wickability. One reason is that more hydrophilic groups, i.e. carboxyl and hydroxyl end groups, were generated due to surface hydrolysis. These hydrophilic groups led to improved wettability. Another reason is that the sponge-like surface created by hydrolysis enhanced the surface roughness and thus the hydrophilicity of the fiber mats (Quéré et al., *Ann. Rev. Mater. Res.* 2008, 38 (1), 71-99; Miwa et al., *Langmuir* 2000, 16 (13), 5754-5760). Meanwhile, increased porosity and pore size of the fiber mats led to enhanced wickability (Kissa et al., *Text. Res. J.* 1996, 66(10), 660-668; Patnaik et al., *Text. Prog.* 2006, 38 (1), 1-105). All of these factors contributed to the superhydrophilicity of h-PBT fiber mats (Drelich et al., *Langmuir* 2010, 26(24), 18621-18623).

Moreover, as observed in the photographs in FIG. 9, h-PBT fiber mat treated for 20 min sucked water much faster than the one treated for 10 min. There are two possible reasons contributing to this phenomenon. One is that 20 min-treated h-PBT fiber mat was rougher than 10 min-treated one, which increased the hydrophilicity. The other one is because the increased porosity and pore size improved the wickability. In addition, there seems no difference between 20 min-treated h-PBT fiber mat and 30 min-treated one in hydrophilicity and wickability. Similar behavior was also found in the 50° C.-treated and 55° C.-treated samples. It is believed that this was a combined effect of fiber surface roughness, dav, porosity and pore size, and water droplet volume (Kissa et al., *Text. Res. J.* 1996, 66(10), 660-668; Patnaik et al., *Text. Prog.* 2006, 38 (1), 1-105).

Example 9—Superhydrophobicity of f-PBT Fiber Mat

It has been demonstrated that hydrolysis roughened PBT fiber surfaces, as shown in FIG. 7. Meanwhile, it generated more carboxyl and hydroxyl end groups. These end groups not only played an important role in superhydrophilicity but also provided reactive cites to create a low-surface-energy monolayer. Such a low-surface-energy monolayer combined with textured surface of h-PBT fibers offered great potential to create a hydrophobic or superhydrophobic surface.

Figure 10A:
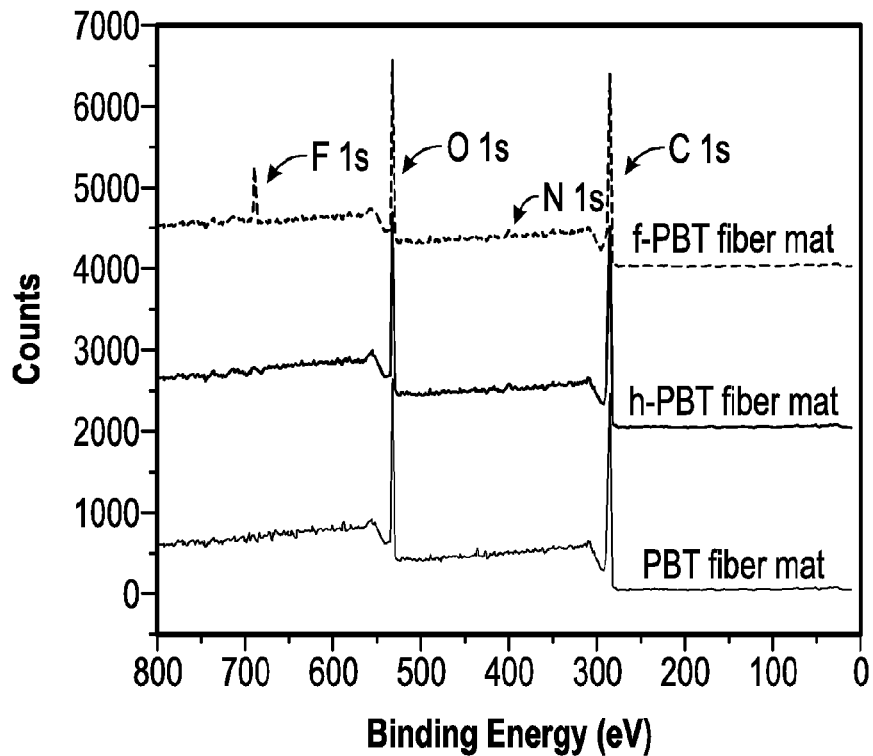
FIG. 10 shows surface analysis of f-PBT fibers of (a) chemical composition by XPS, and (b) physical structure by SEM.
Figure 10B:
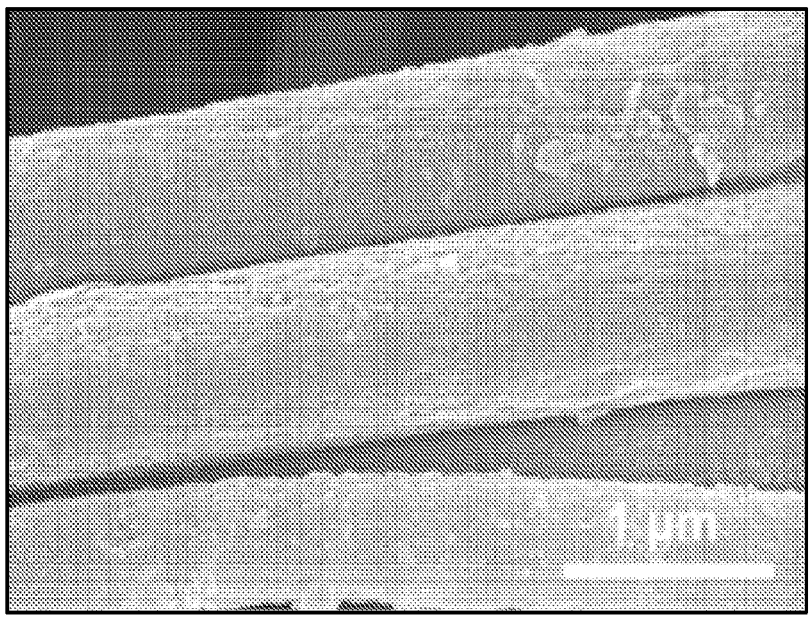

Therefore, PFOA was used to react with carboxyl end groups along the fiber surface to create fluorinated h-PBT (f-PBT) fiber surface. As shown in FIG. 10(a), comparing with the XPS survey spectrum of h-PBT fibers, f-PBT fibers showed an apparent F 1 s peak, indicating the success of fluorination. According to the spectra, untreated PBT fiber mat gave a C/O ratio of 77/23 which is pretty close to the literature value of 75/25 (Burrell et al., *Surf. Sci. Spectra* 1999, 6 (1), 5-8). The C/O ratio from h-PBT fiber mat was 74/26, roughly matching that from untreated PBT fiber mat. This is reasonable because surface hydrolysis changed surface molecules rather than elemental ratio. But, C/O ratio of f-PBT fiber mat increased to 69/25 due to the existence of fluorine on the surface. There was about 5 atom % of fluorine on the surface of f-PBT fibers. This indicates a significant amount of fluorine on the surface, considering that fluorination occurred only at the outmost surface layer of the top 10 nm-thick surface. In addition, SEM image in FIG. 10(b) showed that the fiber surface roughness was maintained during fluorination.

Figure 11:
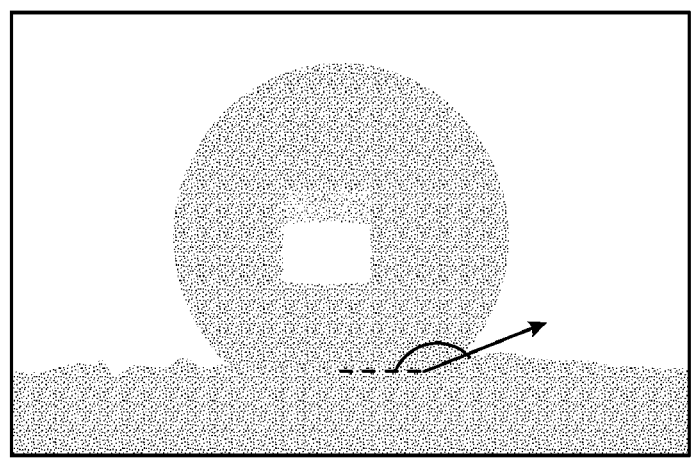
FIG. 11 shows sessile drop measurement on f-PBT fiber mat, $CA_{f\text{-}PBT\ fiber\ mat}$=156±5°.

To investigate the effect of fluorination on surface wetting property of the fiber mat, water contact angle of f-PBT fiber mat was measured. As shown in the FIG. 11, $CA_{f\text{-}PBT\,fiber\,mat}=156\pm5°$, indicating a superhydrophobic surface. To evaluate the slide-off angle, the substrate was tilted and even inverted. The water droplet always attached on the surface. Therefore, simultaneous superhydrophobicity and high adhesion from f-PBT fiber mat surface were obtained. Such a phenomenon has been reported on peanut leaf and named as sticky superhydrophobic surface (Yang et al., *Small* 2013, DOI: 10.1002/smll.201301029; Balu et al., *Langmuir* 2008, 24 (9), 4785-4790). For f-PBT fiber mat, the three-phase contact line of water droplet on the fiber mat might have been quasi-continuous at the microscale but discontinuous at the nanoscale because of the sponge-like fiber surface, which might have caused the sticky superhydrophobic surface (Yang et al., *Small* 2013, DOI: 10.1002/smll.201301029).

Figure 12:
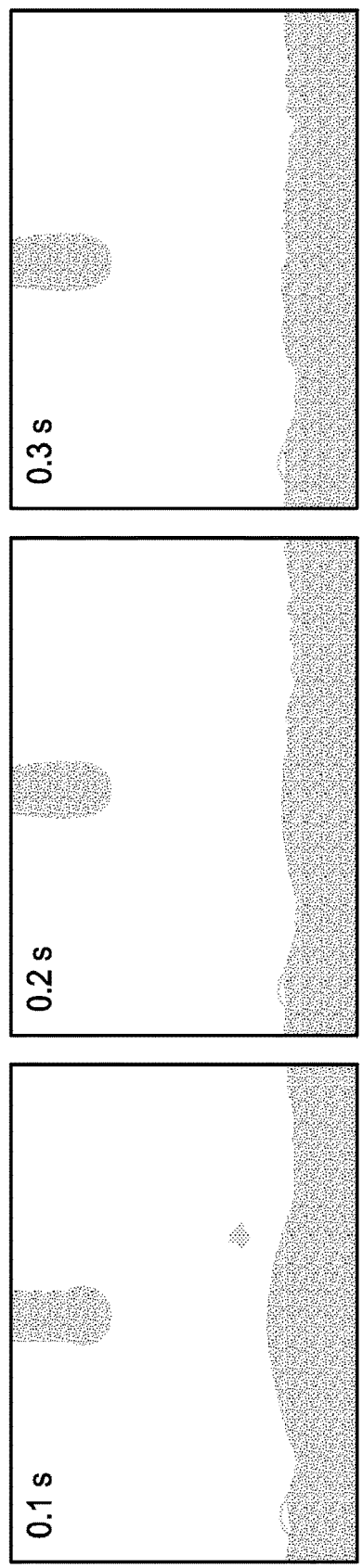
FIG. 12 shows oleophilicity of f-PBT fiber mats. Droplets of ultra-low sulfur diesel (ULSD) completely wetted all the fiber mats.

As shown in FIG. 12, the f-PBT fiber mat is also oleophilic, as droplets of ultra-low sulfur diesel (ULSD) completely wetted all the fiber mats.

Example 10—Summary

The above examples demonstrate a facile way to tune surface wetting property of PBT melt blown fibers by NaOH hydrolysis and subsequent fluorination with PFOA. NaOH hydrolysis led to mass loss of the fiber mats and porosity increase while the original size and integrity was maintained. Also, the hydrolysis decreased the average fiber diameter from 865 nm to 385 nm. At the same time, it created textured, sponge-like fiber surface with more hydrophilic carboxyl and hydroxyl end groups. Such a combination imparted the original hydrophobic fiber mat with superhydrophilicity. Moreover, sticky superhydrophobic surface was prepared by chemically bonding PFOA onto the textured fiber surface. This approach, hydrolysis followed by simple fluorination, might be applicable for surface wetting modification of other polyester fabrics. It also provides potential to prepare composite materials, such as hydrophobic/hydrophilic filtration media.

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

What is claimed is:

1. A method for modifying a polyester and polyester based fiber, comprising subjecting said polyester fiber to alkaline hydrolysis, and further functionalizing the polyester fiber by fluorination in a solution comprising a fluoro-amine compound to obtain a functionalized fiber.

2. The method of claim 1, wherein the modification of the polyester and polyester based fiber comprises modifying:
    surface properties including surface topology and surface wetting; and
    diameter properties including an average fiber diameter and a fiber diameter distribution of the polyester and polyester-based fiber.

3. The method of claim 1, wherein the polyester fiber comprises poly(butylene terephthalate) (PBT).

4. The method of claim 1, wherein the hydrolysis produces carboxyl and/or hydroxyl functional groups on the surface of the polyester fiber.

5. The method of claim 1, wherein the polyester fiber comprises a nonwoven fiber.

6. The method of claim 1, wherein the polyester fiber comprises a melt-blown nonwoven fiber.

7. The method of claim 1, wherein the polyester fiber comprises a polymer which comprises at least one ester bond that can be hydrolytically cleaved.

8. The method of claim 1, wherein the polyester fiber is part of a melt-blown fiber mat comprising PBT and, optionally, poly(ethylene terephthalate) (PET) and/or poly(lactic acid) (PLA).

9. The method of claim 1, wherein the polyester fiber has a crystallinity of at least 20%.

* * * * *